UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

RESINOUS COMPOSITION.

1,091,627.  Specification of Letters Patent. Patented Mar. 31, 1914.

No Drawing. Application filed September 12, 1912. Serial No. 719,989.

*To all whom it may concern:*

Be it known that I, MICHAEL J. CALLAHAN, a citizen of the United States, residing at Pittsfield, county of Berkshire, State of Massachusetts, have invented certain new and useful Improvements in Resinous Compositions, of which the following is a specification.

The present invention comprises a new composition and the process of making the same. Its object is to provide synthetic resinous or gummy compositions which if desired may be rendered insoluble and infusible, and which are useful for the production of molded articles, electrical insulation, varnishes, etc.

In accordance with my present invention glycerol, $C_3H_5(OH)_3$, or other polyhydric alcohol is chemically combined with malic acid $C_2H_4O(CO_2H)_2$, to form a flexible condensation product which may be rendered insoluble and infusible without loss of flexibility.

In order to illustrate my invention, I will describe in detail the production of a malic acid resin of glycerol. A mixture of 134 parts malic acid and 92 parts glycerol, these being equal molecular proportions, is gradually heated in a suitable receptacle until active ebullition sets in. This will ordinarily take place at about 110° C. The temperature gradually rises with continued boiling until it reaches 235° C. where violent ebullition begins. At this stage a clear, flexible, gummy and somewhat sticky material is produced, soluble in acetone and fusible at a temperature of 100° C. This product may be used for impregnating tape or other electrical insulation. It may also be mixed, for example, by solution, in a common solvent such as acetone with brittle resins, such as the condensation product of glycerol and phthalic acid.

When it is desired to convert the resin to an insoluble, infusible state it is heated for some time at a temperature below its melting point. The exact time required for hardening will depend upon the thickness of the material to be hardened and the temperature. A layer about one-fifth of an inch in thickness may be converted to the insoluble, infusible state when heated at a temperature rising to about 100° C. in about 15 hours. Thicker layers require a longer time. The infusible product may be comminuted and molded with or without a filler under pressure, preferably while being heated. In a like manner, malic acid may be combined with other polyhydric alcohols, such as glycol, mannitol, and the like. The malic acid may be used in a fashion similar to succinic acid to introduce flexibility into phthalic resin as described in my copending application, Serial No. 694,350, by boiling up equal parts of malic and phthalic acids with glycerol, and hardening either slowly or by rapid heating in the usual manner. It may also be mixed, for example, by solution with camphoric acid resins, described in my application, Serial No. 719,990 to obtain a strong, tough product.

The resinous product may be saponified with an alkali, such as a solution of sodium hydroxid with the formation of glycerol, or whatever other polyhydric alcohol was employed, and a compound of malic and fumaric acids with the alkali.

What I claim as new and desire to secure by Letters Patent of the United States, is,

1. The process of making a gummy material which consists in reacting upon a polyhydric alcohol with malic acid.

2. The process of making a resinous or gummy material which consists in reacting upon glycerol with malic acid.

3. The process of making a resinous or gummy material which consists in reacting upon glycerol with malic acid in molecular proportions.

4. The process which consists in heating a mixture of glycerol and malic acid until reaction occurs with the production of a resinous material and then heating the product until it becomes infusible.

5. A composition of matter comprising a resinous condensation product of malic acid and a polyhydric alcohol, said product being insoluble and infusible and a non-conductor of electricity.

6. A composition of matter, comprising a flexible, resinous condensation product of malic acid and glycerol, said product being saponifiable with an alkali solution to yield glycerol and compounds of malic and fumaric acids.

In witness whereof, I have hereunto set my hand this 3rd day of September, 1912.

MICHAEL J. CALLAHAN.

Witnesses:
   NEWTON E. DABOLL,
   J. DONALD WOODWARD.